US005488358A

United States Patent [19]

[11] Patent Number: 5,488,358

[45] Date of Patent: Jan. 30, 1996

Hamilton et al.

[54] ELECTRONIC COMBINATION LOCK WITH CLOSURE AND LOCKING VERIFICATION

[75] Inventors: James E. Hamilton; Gerald L. Dawson, both of Lexington; Daniel L. Thompson, Paris, all of Ky.

[73] Assignee: Mas-Hamilton Group, Lexington, Ky.

[21] Appl. No.: 198,835

[22] Filed: Feb. 18, 1994

[51] Int. Cl.[6] .............................. E05B 49/00; G06F 7/04; H04L 9/12

[52] U.S. Cl. ............................... 340/825.31; 340/825.32; 380/23; 380/59

[58] Field of Search ......................... 340/825.31, 825.32, 340/825.34; 380/23, 59; 235/380

[56] References Cited

U.S. PATENT DOCUMENTS

| | | | |
|---|---|---|---|
| 4,800,590 | 1/1989 | Vaughan | 340/825.34 |
| 4,807,139 | 2/1989 | Liechti | 380/23 |
| 4,904,984 | 2/1990 | Gartner et al. | 340/825.31 |
| 5,017,766 | 5/1991 | Tamada et al. | 235/380 |
| 5,061,923 | 10/1991 | Millier et al. | 340/825.31 |
| 5,144,667 | 9/1992 | Pogue, Jr. et al. | 340/825.31 |
| 5,321,242 | 6/1994 | Heath, Jr. | 340/825.31 |
| 5,367,572 | 11/1994 | Weiss | 340/825.34 |

FOREIGN PATENT DOCUMENTS

| | | | |
|---|---|---|---|
| 361881 | 4/1990 | European Pat. Off. . | |
| 599636 | 1/1994 | European Pat. Off. . | |
| 2241734 | 9/1991 | United Kingdom | 340/825.31 |
| 18169 | 11/1991 | WIPO . | |

*Primary Examiner*—Alyssa H. Bowler
*Assistant Examiner*—Mark H. Rinehart
*Attorney, Agent, or Firm*—Laurence R. Letson

[57] ABSTRACT

A lock is described which has the capability to generate or encrypt a close number which is then displayed to the operator of the lock to be used to verify the locking of the lock. This number must be reported to a central dispatch operation where it is compared with a number similarly generated using identical starting values and an identical encryption algorithm. Comparison of the two numbers, resulting in a compare equal will indicate that the lock has been locked since the lock encryption operation is dependent upon the repowering of the lock. The lock is repowered after it has been opened by rotation of the dial which will extend the bolt and through the rotation of the dial drive a stepper motor/generator to provide electrical power to the lock.

11 Claims, 3 Drawing Sheets

ELECTRONIC COMBINATION LOCK WITH CLOSURE AND LOCKING VERIFICATION

FIELD OF THE INVENTION

This invention relates to electronic locks and more specifically to electronic locks which have the capability to verify the closure or locking or to provide an output which may be used to verify the locking.

RELATED UNITED STATES PATENT APPLICATION

This invention is related to the application entitled, "Electronic Combination Lock Utilizing A One-Time Use Combination" by Gerald L. Dawson, et al., U.S. Ser. No. 08/139,450, filed Oct. 20, 1993. This application describes improvements to the Mas-Hamilton X-07 electronic combination lock manufactured by Mas-Hamilton Group, Lexington, Ky. 40571.

BACKGROUND OF THE INVENTION

Automatic teller machines (ATMs) are frequently located in kiosks or other stand-alone buildings which are essentially unsupervised, notwithstanding the need for a very high level of security to safeguard access as well as the substantial amount of money which is typically present in automatic teller machines.

The ATM requires frequent collection of deposits and/or replenishment of the ATM currency supply due to the nature of the financial transactions conducted at ATMs, including disbursement of cash and the correspondent withdrawal from the appropriate bank account, as well as the acceptance of cash and checks for deposit to an accountholder's account. In addition, the ATM apparatuses require regular maintenance and service to ensure reliable operation and the continued correct dispensation of currency. These replenishment and/or service procedures of the ATM require that a service person physically visit the location, open the vault, service the apparatus to correct either electrical or mechanical malfunctions, perform periodic maintenance, collect deposits, replenish currency supplies, close the vault, and actually lock the combination lock on the vault.

The invention described in tile above referred to related patent application substantially increases the security of the vault in that the ATM combination changes with each usage; thus, someone cannot return at a later time to open the vault to access the ATM and its contents using the last combination which was valid to open the lock. Even with this improved type of lock and that the operator may not reopen the lock using the combination previously used, some exposure to theft still remains. A dishonest employee or service person might leave the vault in an unlocked condition for a period of time and then return to open the vault. Reopening of the vault is accomplished by merely leaving the lock bolt in its position, unextended, thereby not locking the vault. This also leaves the lock very vulnerable to other unknown individuals during the period of non-attendance and in an unlocked condition, compounding any security breach and exposure. Inasmuch as the operator of the electronic combination lock utilizing a one-time use combination must communicate with a central dispatcher in order to acquire the current ATM combination after being properly identified and authenticated, further communication with the dispatcher to confirm closure is not a significant problem. Further, the lock described in the above identified related application is very suited to further modification to add an additional security feature to ensure that the lock is locked before the service individual leaves the ATM site. Although, in most cases, the vaults and/or ATMs are alarmed to indicate to the host computer controlling the vault or ATM, the status of the vault door, they may not be alarmed or connected to provide the lock status so that the vault of the ATM may be closed and the lock left in the unlocked condition without creating an alarm at the control center. The lock itself typically is not alarmed and there is no reliable way to ensure the bolt closure and locking of the lock without modification of the lock and/or the vault.

SUMMARY OF THE INVENTION

It is an object of the invention to eliminate the circumstance that a vault lock might be left unlocked at the end of an authorized access.

It is another object of the invention to provide a reportable parameter to the operator of the lock which may then be used to inform a dispatcher once the lock is actually locked.

It is an additional object of the invention to encrypt variable coded resident values stored in the lock and to display the result of such encryption in order to report and confirm the closure and locking of the lock. This invention is preferably used in conjunction with a computer system which generates an identical encrypted number using the same values as are resident in the lock.

The shortcomings of locks without locking verification are overcome and the objects of the invention accomplished by the instant invention. The instant invention provides a technique to monitor the lock so that the lock must be locked at the end of an authorized access or supervisory personnel are informed and actions may be taken to deny the service person access to any other ATMs while the lock remains open. The lock embodying the instant invention encrypts values stored in the electronics of the lock to provide a unique value or number which then may be reported to a central dispatcher or to a dispatch station directly and compared with a number created or similarly encrypted by the central dispatch system. Upon favorable comparison of the reported number and the number generated by the central dispatch system, access to the specific combination lock and/or associated ATM may be indicated as "closed and secured," and that service access incident terminated.

In the lock described in the related application identified above which utilizes a one-time combination, the memory of the lock stores several values, any or all of which may be used or selected portions thereof may be used in the encryption process to result in a derivable closure security code or close number. For high level security to be maintained, at least one of the values used in the encryption process should change in what may appear to be a quasi random fashion with each authorized entry through the lock. In the case of the ATM lock described in the above identified related application, the lock has among other values stored therein a master combination, a bank combination, an ATM combination, a serial number, and a seal count.

The ATM combination is the combination which most recently opened the lock in normal operation and which was obtained from the central dispatch system but is different from the bank combination if the bank combination was the last combination to actually open the lock. The bank combination is manually changed and is otherwise constant. The master combination changes periodically at variable intervals and serves as a control value but will not open the lock. The seal count is the sequential count of the number of times the lock has been successfully opened. The ATM combination changes with each successful opening of the lock, the serial number of the lock is fixed, and the seal count predictably is incremented by one with each successful lock opening.

In view of the fact that the serial number of the lock is fixed and the seal count is incremented by a constant increment on each successful opening of the lock, these two values are not particularly desirable starting values for use to create a quasi random and non-predictable number or value. It is preferred that two variable values or a combination of one fixed value and one variable value may be manipulated and encrypted through an encryption scheme to yield a multiple digit numerical result. The result then is shown to the operator on the display of the lock.

The operator then must call the dispatch center to report the closure of the lock and the closure verification code otherwise referred to as the close number.

The preferred approach to encrypting the variable values found within the lock memory is to combine predesignated digits of the intermittently changeable master combination to yield a two-digit value which then is mathematically combined, such as added or subtracted, with two other predesignated digits of the master combination. The resulting value is available for subsequent use.

The ATM combination is the basis for the second encryption operation. Similarly, two predesignated digits of the ATM combination are combined to yield a two-digit value, in turn, which is mathematically combined, such as added or subtracted, with two other predesignated digits of the ATM combination to yield an additional two-digit result. The predesignated digits of the ATM may have the same relative positions as, or different positions from, the predesignated digits of the master combination used previously. This two-digit result is mathematically combined (such as added or subtracted) with the two-digit result coming from encryption of the master combination previously determined and held available for use. Should the mathematical operation ever result in a three digit number, the one hundreds digit is always discarded or ignored. The lock, under microprocessor control, displays the resulting two-digit code which comes from the mathematical combination of the result of encrypting the master combination and encrypting the ATM combination. The displayed two-digit value is the closure verification code or the close number.

The lock verification encryption algorithm is activated with the rotation of the lock dial which will extend the bolt and also will power the lock. The rotation of the dial will act to mechanically push the bolt into an extended position and also to repower the lock by driving the stepper motor which acts as a generator.

Upon closure and locking the operator observes the close number and then should communicate with the dispatcher and subsequently inform the dispatcher of the displayed verification code.

Once the verification code has been communicated to the dispatcher, the central dispatch computer compares the reported verification code or close number with a separately calculated and encrypted code which is also based upon the master combination and the ATM opening combination as they are stored at the central dispatch station. The dispatcher enters the close number into a computer for the comparison. The dispatcher may be assured that the lock is properly locked if the code favorably compares or matches.

Should the code not favorably compare, the dispatcher then may make inquiry of the operator at the ATM site to reverify the code. This verified code then may be further compared and the supervisor of the dispatch operation is notified following several, such as three, comparisons with unfavorable results, Every time that the lock is repowered, the close number encryption algorithm is initiated. Accordingly, the close number will be displayed at two different times, once as the lock is being locked and as the lock is initially powered prior to the entry of a opening combination.

The central dispatch system close number is generated preferably by a computer which performs the identical encryption algorithm as performed by the microprocessor of the lock. The computer performs the current combination calculations to provide the current combination for transmittal to the operator at the lock site and has resident within its memories the master combination, the latest opening combination or ATM combination or other variable values necessary for determining the current ATM combination. Therefore, both the lock and the computer possess the necessary variables for encryption to yield the close number in accordance with the close number algorithm. Each time a dispatcher receives the close number from the lock, preferably the close number is immediately entered into the dispatch computer for comparison with the generated number as described above and after several, such as three, unsuccessful attempts to compare the computer then will react in such a way that the supervisor must be notified for the computer to continue either to function or to generate combinations for the subject lock or any other lock on the system so long as there is a mismatch. The computer may be programmed to require an override by the supervisor to restore the computer to full operation, ensuring the supervisor be involved whenever a correct close number is not communicated to the dispatch center.

A better understanding of the preferred embodiment of this invention may be had from the drawings and the detailed description of the invention to follow.

DRAWINGS

DETAILED DESCRIPTION OF THE PREFERRED EMBODIMENT OF THE BEST MODE CONTEMPLATED BY THE INVENTOR FOR CARRYING OUT THE INVENTION

Figure 1:
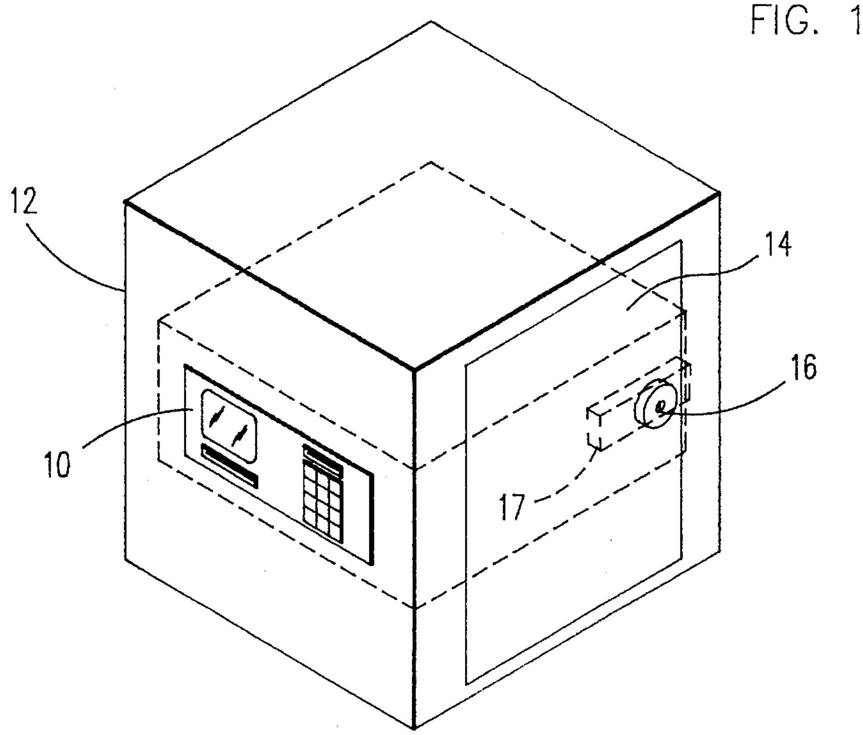
FIG. 1 illustrates the installation of an ATM in a vault which utilizes a lock of the instant invention.

With initial reference to FIG. 1, ATM 10 is enclosed within a vault 12. The ATM vault 12 has a door or other closure 14 which is secured in a closed position by lock 16. Lock housing 17 on the interior of door 14 encloses the electronics 38 and the mechanical portions 18 of lock 16.

Figure 2:
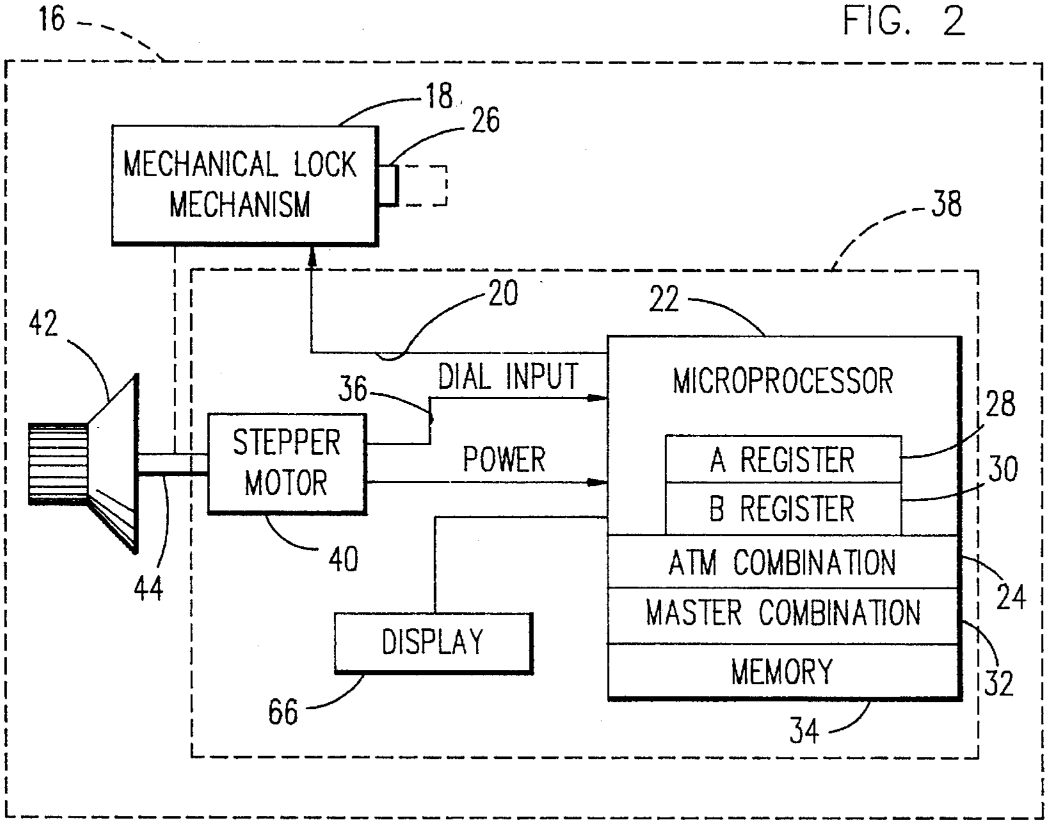
FIG. 2 illustrates the input dial, mechanical lock mechanism, and the electronic controls of the instant lock necessary to implement the invention.

Referring now to FIG. 2, the relevant portions of lock 16 are illustrated. A complete illustration and description of lock 16 is not included in this application inasmuch as there are portions of the lock 16 and its operation which are not relevant to the invention described herein. For a more complete understanding of the ATM lock and its more complete operation, reference should be made to the related application identified above.

Lock 16 is controlled by microprocessor 22 which includes multiple memories or memory segments for storing several different variable and fixed values. Those memories which store the values used in the preferred embodiment of the invention are the ATM combination memory 24 and the master combination memory 32. Memory 34 can be used for storage of other values, such as seal count, bank combination, and serial number any of which could be used in lieu of the ATM combination or the master combination if the security risk were acceptable. The microprocessor 22 will electronically access and read the contents of memories 24, 32, 34 upon appropriate program controlled operation. The microprocessor 22 further is connected to and controls a display 66; the displays may include: numbers that are incremented either in an increasing or decreasing manner for purposes of entering the combination, counts such as the error count or the number of erroneous unsuccessful attempts to open the lock 16; the seal count, which is the number of times the lock 16 has been correctly opened; error signals manifested as a lightning bolt to advise the operator that an error has occurred in the operation of the lock; and, other symbols which are not relevant to the subject invention described herein.

Operator control of the lock 16 and generation of power for the electronic control of the lock 16 is accomplished through rotation of dial 42 and shaft 44. Shaft 44 drives stepper motor 40 which has a dual function. The first function of the stepper motor 40 is to serve as a generator to power the electronic controls 38 of the lock 16. The second function of the stepper motor 40 is to provide an electronic pulse train which may be used to electronically represent rotary motion of dial 42 and shaft 44 into signals which the program controlled microprocessor 22 may utilize to determine and measure the movement of dial 42. Any pulse train signals are provided across the dial input line 36 to the microprocessor 22.

Additionally, shaft 44 is mechanically connected to the mechanical lock mechanism 18. Mechanical lock mechanism 18 is controlled over line 20 by microprocessor 22. The mechanical lock mechanism 18 is the portion of the lock 16 which causes bolt 26 to extend to lock the vault 12 and door 14, as illustrated in FIG. 1.

Microprocessor 22 is controlled by a program embedded therein. The control program portion for this invention may be written for any of several microprocessors by a programmer having skill in the art of programming following the flow diagram of FIG. 4. Since continuous power is not provided to the microprocessor 22, the electronic controls 38 must be powered prior to operation. The dial 42 of lock 16 is rotated by the operator to turn the stepper motor 40 and to generate the power necessary to provide operating electrical power to the microprocessor 22 and other electronic control 38 elements of lock 16. Once the power generation by stepper motor 40 has reached a minimum operating level for microprocessor 22, as established by the microprocessor manufacturer, microprocessor 22 initializes as is well known in the art of microprocessors and begins its operation at a set starting point in its control program. The initialization point for the program is the starting point for the program. The initial program operation is to determine the number of times that an erroneous combination has been used to attempt to open the lock 16 since the last time the lock 16 was successfully opened. If there would be no erroneous attempts to open the lock, the error count would not be displayed. This aspect of the lock 16 operation is not relevant to the operation of the instant invention, only that it precedes the program control of the lock 16 to encrypt or generate the close number. Accordingly, the encryption of the variable values stored within the memories 24 and 32 of microprocessor 22 will be initiated in accord with the program control of the microprocessor 22 and preferably will follow a predefined algorithm, preferably such as the one to be described. It should be understood that the precise algorithm described and illustrated is only illustrative and other combinations and techniques could be substituted so long as an encrypted value is determined and displayed, as will be described below.

Figure 3:
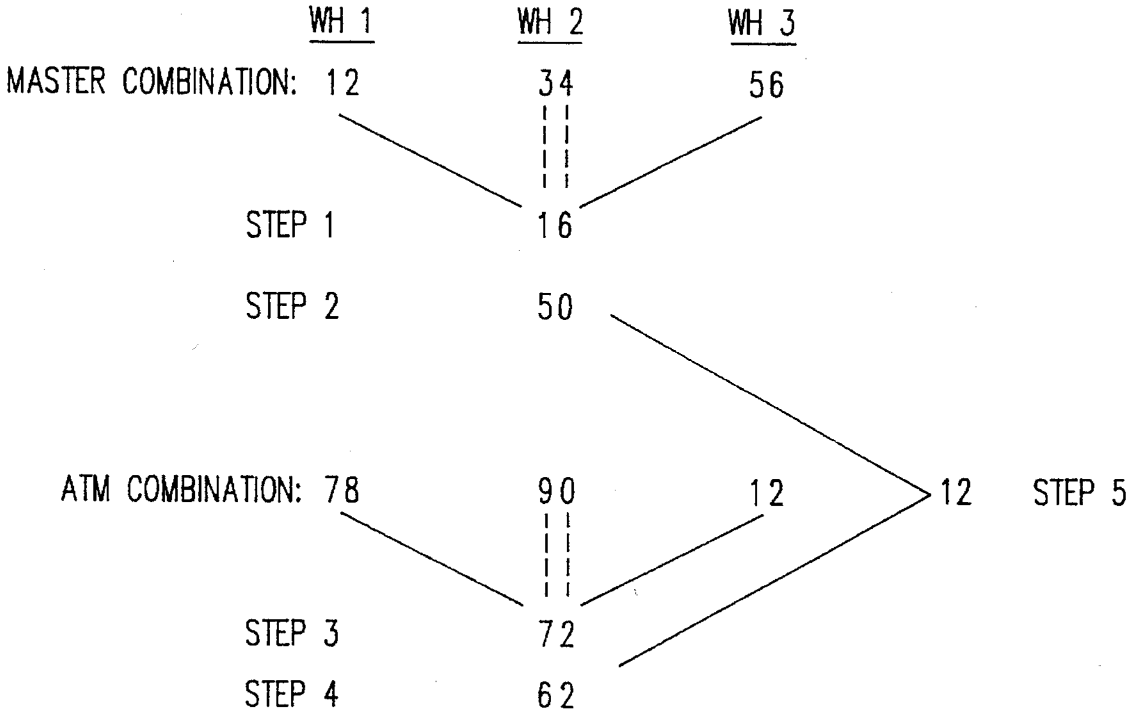
FIG. 3 is an illustration of the preferred encryption process which yields the close number.

Referring to FIG. 3, the steps of the preferred encryption will be described in conjunction with an example. To ease the discussion of the encryption process, "wheel" is defined in terminology carried forward from mechanical combination locks. "Wheel" is a term used to designate two-digit numbers, three of which make up a combination in this example, and represent the numbers which are combined to form the lock combination. Wheel 1 represents the first two-digit number of the combination; wheel 2, the second two-digit number of the combination, and wheel 3, the third two-digit combination element.

The master combination of the lock 16, a combination which does not open the lock 16 but which is used to determine the one-time use combinations for the lock 16 and which is changeable from time to time automatically, is a six-digit number made up of two-digit numbers for each of the three wheels. By way of example, if the master combination is 12-34-56, wheel 1 has a value of 12; wheel 2 a value of 34 and wheel 3 a value of 56.

The preferred encryption algorithm embodied in the control program of the microprocessor 22 will assemble or combine the highest order digit from wheel 1 and the lowest order digit from wheel 3 resulting in a two-digit value of 16. This two-digit value of 16 then is added to the wheel 2 value, 34, resulting in an interim two-digit result of 50 as can be seen in FIG. 3. A similar process is performed with respect to the ATM combination stored in memory 24.

For the sake of this discussion and by way of example, the ATM combination, the last combination which successfully opened the lock 16 is 78-90-12. Similar to the steps performed with respect to the master combination, the lowest order digit of wheel 3 and the highest order digit of wheel 1 are assembled or combined to yield a two-digit value of 72.

This two-digit value of 72 then is mathematically combined with, preferably added to, the number or numerical value of wheel 2 of the ATM combination which, in this example, is 90 and results in a value of 162. For any value that results from this operation or any mathematical operation with regard to the master combination and is in excess of 99, any digit in the hundreds position is discarded and only those digits in the units in ten positions are used. Accordingly, the two-digit value derived from combining predetermined digits of the ATM combination in this example will be 62 with the discarding of the one (1) resident in the hundreds position.

In the next step, the value determined in step 2 of 50 and the value determined in step 4 of 62 are added to yield 112. Again, any number residing in the hundreds position is either ignored or discarded resulting in a close verification number or a close number of 12. After determination, the close number is displayed on the lock display 66 so that the operator may observe it and communicate it to the central dispatcher.

The master combination is changed frequently and the ATM combination is changed with every opening of the lock 16. Therefore, the two variable numbers stored within lock 16 which are the subject of this illustrative encryption process are sufficiently variable and changed frequently enough to make the prediction of the close number very difficult without knowledge of both the master combination and the ATM combination.

Figure 4:
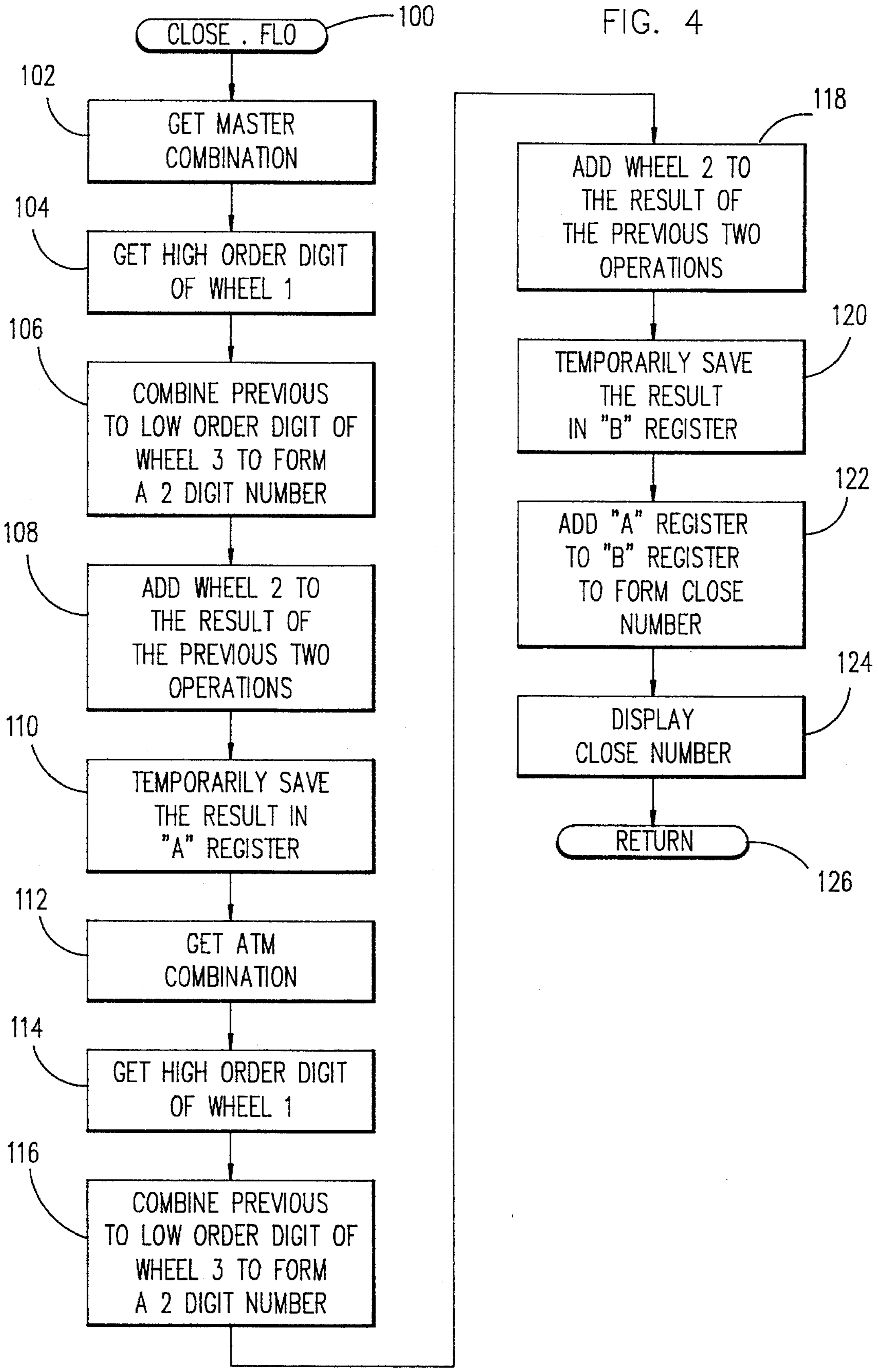
FIG. 4 is a flow diagram illustrating the electronic processes performed to generate the close number or to encrypt the variable values resident within the lock memories in order to yield the close number.

FIG. 4 is a flow diagram illustrating the process of encryption described above. Referring to FIG. 4, the close number subroutine of the instant invention is entered at operation 100 of the subroutine designated as CLOSE-.FLOW and the next operation of the subroutine is to get or retrieve the master combination for the lock 16 from master combination memory 32, as illustrated as operation 102.

Thereafter, in operation 104 the highest order digit of wheel 1 of the master combination is retrieved and in operation 106 combined with the lowest order digit of wheel 3 to form a two-digit number. The two-digit number resulting in operation 106 is added to the numerical value of wheel 2 in operation 108. The result of operation 108 is temporarily saved in the A Register 28 as illustrated in FIG. 2, in operation 110.

The ATM combination is then either fetched or retrieved in operation 112 from memory 24 in FIG. 2. After the ATM combination has been retrieved, the highest order digit of wheel 1 is fetched in operation 114 and combined with the lowest order digit of wheel 3 in operation 116, yielding another two-digit number. This resulting two-digit number from operation 116 is added to the value of wheel 2 of the ATM combination in operation 118, yielding a two-digit number which then is temporarily saved in the B Register 30 as illustrated in FIG. 2, in operation 120. The contents of the A Register 28 and B Register 30 are added to form the close number in operation 122. In operation 124, the close number determined in operation 122 is displayed on display 66 shown in FIG. 2. In operation 126 the logic flow returns to the main control program which controls the operation of lock 16.

This close number encryption algorithm is resident not only within the control program for microprocessor 22 but also is resident within the application control program of a computer at the central dispatch station. The computer at the central dispatch station runs software which performs the identical operations to the operations in microprocessor 22 for purposes of generating the ATM combination, as more fully described in the related application identified above, but also is capable of similarly encrypting the values stored in the memory of the computer at the dispatch station. Since the dispatch station computer has stored the identical master combination and ATM combination values in its memories, solid state or on disk, the encryption of these two values will yield the same close number as the lock subroutine when operated in the lock 16. Accordingly, when the computer at the dispatch station is provided with the close number generated or encrypted by lock 16, it will independently generate the close number and then compare the two close numbers. Appropriate comparison outcome signals will be then provided to inform the computer operator of a compare equal or compare unequal condition.

Additional enhancements in the ATM security, using the close number of this invention as a basis, may be implemented through operational procedures of either the dispatch center or the dispatch computer through programming. The procedure may include a refusal to issue another combination for any other ATM lock to a service person as long as the dispatch close number has not been favorably compared with the close number provided by the service person. If repeated non-compares occur, the computer then may lock up and cease functioning in its normal manner until such time as an override command has been provided by a supervisor. This ensures that supervisory personnel are informed when a service person fails to provide a valid close number. Accordingly, the supervisor can notify security personnel to respond to the location of the lock or vault. To prevent collusion, the dispatch center computer would not display the close number but would only use it for comparison purposes.

This invention is described as implemented on a Mas-Hamilton X-07 lock, however, this invention may be implemented on locks having numerical values which may be encrypted.

One will understand, if skilled in the art, that the choice of the master and ATM combinations for use in the encryption algorithm provides the highest level of security with regard to the derivation of the close number; but if security considerations permit, the use of the lock serial number or another fixed value stored within the memories of microprocessor 22 may be used in lieu of the master combination or the ATM combination. However, it should be understood that with the use of a fixed number as part of the encryption process, the close number may be somewhat more predictable and, therefore, somewhat less secure.

It should also be understood that the predetermined digits, as illustrated in the example, which were assembled and the two-digit numbers which were added to the combined results may be changed or varied in any manner so that the designer of the lock may chose which digits and which numbers will be used in the encryption process. For example, the digits from one or both combinations may be assembled in reversed positions. The predesignated digits which are assembled in each of the combinations may be from different positions for each combination and the wheel which is used in the encryption of each combination may be different from the wheel value from the other combination. The only requirement is that algorithm for encrypting the combinations must be the same in the lock as in the central dispatch computer.

Further, one skilled in the art will understand that where a mathematical combination number is described, the operation may be addition, subtraction, multiplication, division or other logical operation which is the equivalent of one of these operations.

The lock and close number of the instant invention may be advantageously used on other security installations requiring confirmation of the closure and locking of a container and is not limited to use on ATM installations.

Bearing in mind the disclosed subject matter, and the suggested possible alternatives and changes, it will be apparent to one skilled in the art that other minor modifications may be made but which will not remove the resulting lock and apparatus from the scope of the attached claims.

We claim:

1. An electronic combination lock comprising:

a dial;

a generator connected to said dial for generating electrical power for powering said lock and for entering a first combination into said lock;

electronic controls comprising a program controlled microprocessor for receiving said first combination and said power and for comparing said first combination with an authorized combination and for controlling opening of said lock;

said electronic controls further comprising a memory for storing said combination and at least one additional multiple digit number associated with said lock;

said electronic controls further responsive to said dial and said electrical power to encrypt at least portions of two numerical values including said first combination and one of said at least one additional multiple digit numbers stored in said memory to produce an encrypted number upon powering of said lock;

a display responsive to said electronic controls to display said encrypted number;

whereby said number may be observed and reported for comparison to a similarly encrypted number to verify said lock as locked.

2. The lock of claim 1 wherein said two numerical values comprise said first combination and a second combination and said electronic controls encrypt said first combination and encrypts said second combination and combines results of said encryptions to yield said encrypted number.

3. The lock of claim 1 wherein said electronic control comprises program controlled logic for combining two preselected digits of said first combination to yield a first two digit result, mathematically combining said two digit result with two predesignated digits of said first combination to yield a second two digit result, combining two preselected digits of said second combination to yield a third two digit result, mathematically combining said third two digit result with two predesignated digits of said second combination to yield a fourth two digit result, and mathematically combining said second two digit result and said fourth two digit result to yield a two digit number which is unique to each opening and closing of said lock.

4. A method of verifying closure of a combination lock comprising the steps of:

providing a lock having a display, a bolt and a member for extending said bolt to a locked position;

moving said member to extend said bolt to a locked position;

providing storage memories within said lock for storing at least a first and a second changeable numerical values each having a plurality of digits;

storing in said storage memories at least said first and second changeable numerical values;

moving said member for extending said bolt to extend said bolt to a locked position and continuing to move said member for extending said bolt;

responsive to movement of said member for extending said bolt to extend said bolt to a locked position and said continuing movement of said member for extending said bolt, combining each of two predesignated digits of said first numerical value to form a first two digit result;

mathematically combining said third two digit result with a predesignated two digit number forming a portion of said second numerical value to yield a fourth two digit result;

mathematically combining said second and said fourth results to yield a two digit close number;

transmitting said number to a remote location for comparison with a similarly derived value and upon favorable comparison determination that said lock has been locked.

5. The method of claim 4 further comprising the steps of;

displaying said closure number;

comparing said closure number with a similarly computed number and alerting predesignated personnel to results of said comparing step if said comparing step results in a compare not equal condition.

6. An electronic combination lock comprising;

means for storing within said lock a plurality of numerical values of at least four digits each;

at least two numerical values having at least 4 digits each stored in said means for storing;

means for separately encrypting each of two of said numerical values and for combining results of said encryptions to yield a number having a unique value for each locking of said lock; and means for displaying said number for observation by the operator, whereby the said number will be determined and displayed to an operator, thereby providing an encrypted number to said operator which may be compared with a similarly encrypted number to provide assurance that said lock has been locked.

7. The lock of claim 6, wherein said lock further comprises:

manually operated means for controlling said lock;

means for electrically powering said lock;

means for opening said lock;

means for closing said lock;

said means for powering said lock, said means for opening said lock and said means for closing said lock all responsive to said manually operable means for controlling said lock;

said means for encrypting responsive to said manually operated means for controlling said lock and said means for powering said lock.

8. The lock of claim 7 wherein said means for encrypting is responsive to the operation of said means for electrically powering said lock to encrypt said numerical values and provide said unique value upon each powering of said lock.

9. The lock of claim 7 wherein said means for electrically powering said lock and said means for locking said lock are both responsive to said manually operable means for controlling said lock.

10. The lock of claim 7 wherein at least one of said two numerical values is changed with each operation of said means for unlocking said lock.

11. The lock of claim 10 wherein said other of said numerical values is intermittently changed by said lock upon operation of said means for unlocking said lock.

* * * * *